United States Patent
Rossiter

(10) Patent No.: US 9,666,230 B2
(45) Date of Patent: May 30, 2017

(54) PACKAGE AND CONTAINER ASSEMBLY AND METHOD OF MANUFACTURING SAME

(71) Applicant: Disc Graphics Inc., Hauppauge, NY (US)

(72) Inventor: Shane Rossiter, Los Angeles, CA (US)

(73) Assignee: Disc Graphics Inc., Hauppauge, NY (US)

( * ) Notice: Subject to any disclaimer, the term of this patent is extended or adjusted under 35 U.S.C. 154(b) by 0 days.

(21) Appl. No.: 14/638,214

(22) Filed: Mar. 4, 2015

(65) Prior Publication Data

US 2015/0179215 A1    Jun. 25, 2015

Related U.S. Application Data

(63) Continuation of application No. 14/246,331, filed on Apr. 7, 2014, now Pat. No. 9,305,598.

(Continued)

(51) Int. Cl.
*B65D 85/57* (2006.01)
*G11B 23/03* (2006.01)
(Continued)

(52) U.S. Cl.
CPC ........ *G11B 23/0321* (2013.01); *B32B 37/182* (2013.01); *B32B 38/0004* (2013.01); *B32B 38/0012* (2013.01); *B32B 38/04* (2013.01); *B32B 38/145* (2013.01); *B65D 85/546* (2013.01); *G11B 23/031* (2013.01); *G11B 23/0316* (2013.01); *G11B 33/0444* (2013.01);
(Continued)

(58) Field of Classification Search
CPC ............ G11B 11/0494; G11B 33/0427; G11B 11/0444; B32B 37/182; B65D 85/546
USPC ............... 206/307, 307.1, 308, 308.1, 308.2, 206/310–313, 484, 484.2, 807; 211/40; 229/116.5, 930, 931
See application file for complete search history.

(56) References Cited

U.S. PATENT DOCUMENTS 2,634,046 A * 4/1953 Weber .................. B65D 5/4266
229/116.5
3,654,053 A * 4/1972 Toedter ................ A47B 96/202
229/931

(Continued)

FOREIGN PATENT DOCUMENTS

CA           2514127 A1    3/2005
DE    602004001404 T2    6/2007

(Continued)

OTHER PUBLICATIONS

International Search Report and Written Opinion corresponding to PCT/US2014/033161, dated Sep. 4, 2014.

(Continued)

*Primary Examiner* — Luan K Bui
(74) *Attorney, Agent, or Firm* — Carter, DeLuca, Farrell & Schmidt, LLP

(57) ABSTRACT

A package assembly including a first layer having a bottom surface and a top surface, and at least two panels coupled to the top surface of the first layer such that a first panel is disposed along a right edge of the first layer and the second panel is disposed along a left edge of the first layer, the first panel being pivotally engaged to the second panel along an axis, the at least two panels having formed therein a recess.

11 Claims, 7 Drawing Sheets

Related U.S. Application Data

(60) Provisional application No. 61/900,641, filed on Nov. 6, 2013, provisional application No. 61/809,682, filed on Apr. 8, 2013.

(51) Int. Cl.
 *G11B 33/04* (2006.01)
 *B32B 37/18* (2006.01)
 *B32B 38/00* (2006.01)
 *B32B 38/04* (2006.01)

(52) U.S. Cl.
 CPC .... *G11B 33/0494* (2013.01); *B32B 2038/045* (2013.01); *B32B 2439/00* (2013.01); *Y10T 156/1026* (2015.01); *Y10T 156/1049* (2015.01)

(56) References Cited

U.S. PATENT DOCUMENTS

| | | | |
|---|---|---|---|
| 4,471,881 A | 9/1984 | Foster | |
| 4,634,019 A | 1/1987 | Pherigo | |
| 4,714,157 A | 12/1987 | Morrone | |
| 4,718,550 A * | 1/1988 | Johnson | G11B 23/023 206/387.13 |
| 4,722,439 A | 2/1988 | Grobecker et al. | |
| 4,948,039 A * | 8/1990 | Amatangelo | B65D 5/20 229/198 |
| 4,966,283 A * | 10/1990 | Sykes | B29C 51/00 206/311 |
| 5,284,242 A | 2/1994 | Roth et al. | |
| 5,472,083 A * | 12/1995 | Robinson | B65D 85/546 206/308.1 |
| 5,477,961 A | 12/1995 | Taniyama | |
| 5,547,077 A | 8/1996 | Wang | |
| 5,657,867 A | 8/1997 | Fu et al. | |
| D385,145 S | 10/1997 | VerWeyst et al. | |
| 5,676,272 A | 10/1997 | Baerenwald | |
| 5,725,105 A | 3/1998 | Boland | |
| 5,769,217 A | 6/1998 | Derraugh et al. | |
| 5,782,371 A | 7/1998 | Baerenwald et al. | |
| 5,788,068 A | 8/1998 | Fraser et al. | |
| 5,829,583 A | 11/1998 | VerWeyst et al. | |
| 5,887,713 A | 3/1999 | Smith et al. | |
| 5,908,109 A | 6/1999 | Muto | |
| 5,984,094 A | 11/1999 | Frick | |
| 6,016,909 A | 1/2000 | Chang | |
| 6,041,922 A | 3/2000 | Kollinek | |
| 6,063,227 A * | 5/2000 | Raymond | G09B 29/004 156/259 |
| 6,065,594 A | 5/2000 | Sankey et al. | |
| 6,109,454 A | 8/2000 | Stangebye-Hansen | |
| D434,777 S | 12/2000 | Peterson et al. | |
| D437,520 S | 2/2001 | Choi | |
| 6,196,384 B1 | 3/2001 | Belden, Jr. | |
| 6,199,689 B1 | 3/2001 | Higuchi et al. | |
| D440,108 S | 4/2001 | Derman | |
| 6,220,431 B1 | 4/2001 | Kaser | |
| 6,227,362 B1 | 5/2001 | Cheung | |
| 6,276,524 B1 | 8/2001 | Cerda-Vilaplana et al. | |
| D450,973 S | 11/2001 | Bieda | |
| D451,299 S | 12/2001 | Cheng | |
| D451,747 S | 12/2001 | Tang | |
| D452,104 S | 12/2001 | Tang | |
| D452,105 S | 12/2001 | Chan | |
| D455,595 S | 4/2002 | Ikeda et al. | |
| 6,375,003 B1 | 4/2002 | Lethen et al. | |
| 6,431,352 B1 | 8/2002 | Khosla | |
| 6,478,150 B1 | 11/2002 | Sølling | |
| D468,621 S | 1/2003 | Farrar et al. | |
| 6,502,694 B1 | 1/2003 | Pijanowski et al. | |
| 6,561,347 B1 | 5/2003 | Lax | |
| 6,715,607 B2 | 4/2004 | Wetsch | |
| 6,761,307 B2 * | 7/2004 | Matsuoka | B65D 5/0227 229/198.2 |
| 7,051,872 B2 | 5/2006 | Bjerregaard et al. | |
| 7,232,032 B2 | 6/2007 | Bjerregaard et al. | |
| 7,350,642 B2 | 4/2008 | Bjerregaard et al. | |
| 7,387,203 B2 | 6/2008 | Siecke | |
| 7,793,821 B2 * | 9/2010 | Oliveira | B65D 5/5475 229/104 |
| 8,079,470 B2 * | 12/2011 | Trajkovich | B32B 27/36 206/308.1 |
| 8,544,670 B2 | 10/2013 | Brilmyer | |
| 2002/0020641 A1 | 2/2002 | Cha et al. | |
| 2002/0056654 A1 | 5/2002 | Carman et al. | |
| 2002/0070135 A1 | 6/2002 | Sanders | |
| 2003/0015441 A1 | 1/2003 | Kang et al. | |
| 2003/0062276 A1 | 4/2003 | Chung | |
| 2003/0121807 A1 | 7/2003 | Oguchi | |
| 2004/0020801 A1 | 2/2004 | Solling | |
| 2004/0045845 A1 | 3/2004 | Fraser et al. | |
| 2005/0161350 A1 | 7/2005 | Siecke | |
| 2005/0167302 A1 | 8/2005 | Bjerregaard et al. | |
| 2005/0237202 A1 | 10/2005 | Nichols | |
| 2005/0279657 A1 | 12/2005 | Bjerregaard et al. | |
| 2006/0021899 A1 | 2/2006 | Bjerregaard et al. | |
| 2006/0222823 A1 * | 10/2006 | Hiller | B32B 3/04 428/189 |
| 2008/0105573 A1 * | 5/2008 | Gonzales | G11B 33/0422 206/308.1 |
| 2008/0135430 A1 * | 6/2008 | Fitzsimons | G11B 33/0494 206/308.1 |
| 2009/0314669 A1 * | 12/2009 | Caraher | G11B 33/0444 206/308.1 |
| 2012/0261042 A1 | 10/2012 | Khubani | |
| 2013/0146603 A1 | 6/2013 | Brilmyer | |

FOREIGN PATENT DOCUMENTS

| | | |
|---|---|---|
| EP | 0 576 256 A2 | 12/1993 |
| EP | 0 671 743 A2 | 9/1995 |
| EP | 0 744 746 A2 | 11/1996 |
| EP | 0 789 914 A1 | 8/1997 |
| EP | 0 866 458 A1 | 9/1998 |
| EP | 0 874 768 A1 | 11/1998 |
| EP | 0 895 243 A1 | 2/1999 |
| EP | 1 083 569 A1 | 3/2001 |
| EP | 1 100 088 A2 | 5/2001 |
| EP | 1 107 257 A1 | 6/2001 |
| EP | 1 636 800 A1 | 3/2006 |
| EP | 1 705 662 A2 | 9/2006 |
| FR | 2 753 297 A1 | 3/1998 |
| GB | 2 243 145 A | 10/1991 |
| GB | 2427590 A | 1/2007 |
| JP | 8-102178 | 4/1996 |
| JP | 2002-059987 A | 2/2002 |
| JP | 2006-224988 A | 8/2006 |
| NL | 1000324 C1 | 11/1995 |
| WO | 96/35628 A1 | 11/1996 |
| WO | 00/49619 A1 | 8/2000 |
| WO | 00/53293 A1 | 9/2000 |
| WO | 00/74057 A1 | 12/2000 |
| WO | 2001/96212 A1 | 12/2001 |
| WO | 03/023783 A1 | 3/2003 |
| WO | 03/058626 A2 | 7/2003 |
| WO | 2005/24829 A1 | 3/2005 |
| WO | 2006/106093 A1 | 10/2006 |
| WO | 2008/152344 A1 | 12/2008 |

OTHER PUBLICATIONS

Supplementary European Search Report for corresponding European Application No. 14783145.7 dated Feb. 10, 2017.

* cited by examiner

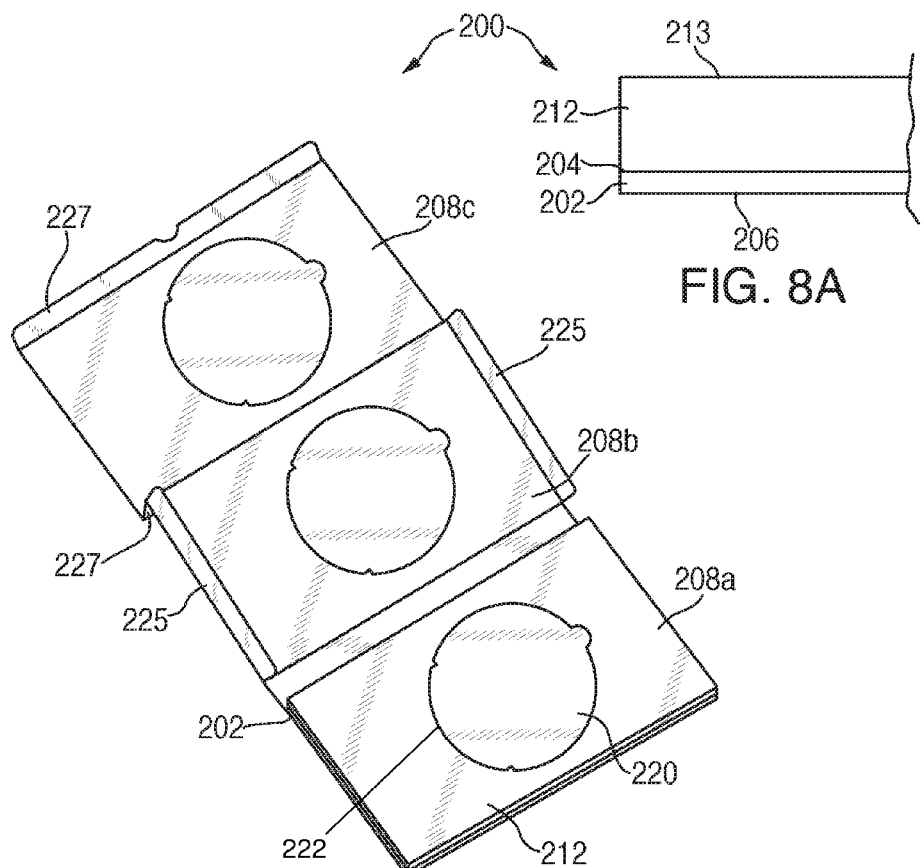
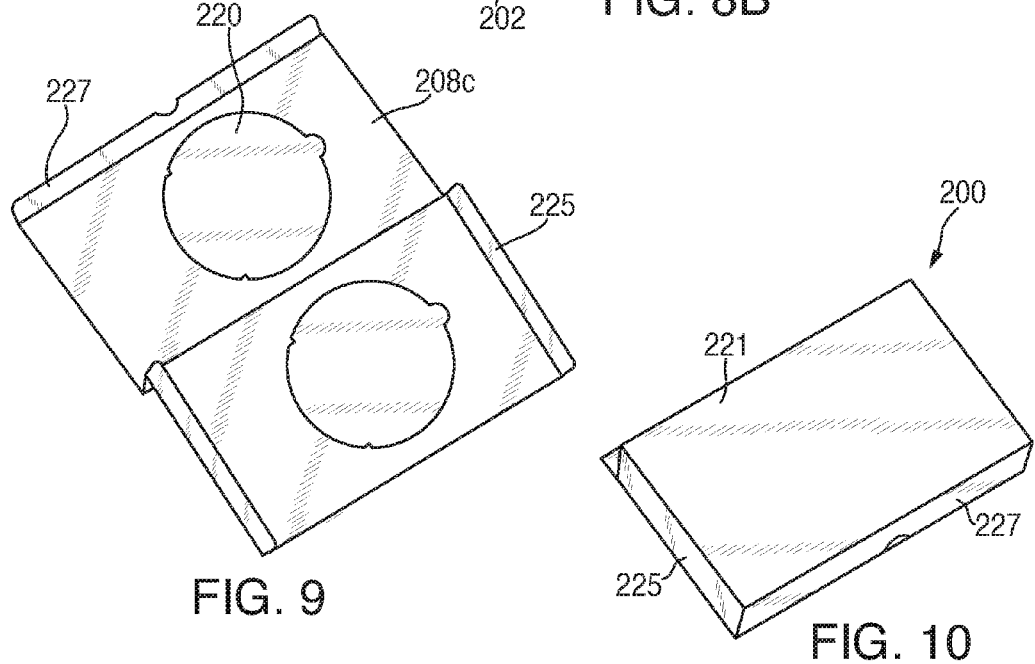

PACKAGE AND CONTAINER ASSEMBLY AND METHOD OF MANUFACTURING SAME

CROSS-REFERENCE TO RELATED APPLICATIONS

This application is a Continuation of U.S. patent application Ser. No. 14/246,331, filed Apr. 7, 2014, now U.S. Pat. No. 9,305,598 which claims the benefit and priority to U.S. Patent Application Nos. 61/900,641 filed Nov. 6, 2013, and 61/809,682 filed Apr. 8, 2013, the entire contents of each of which are hereby incorporated by reference in their entirety.

BACKGROUND

Technical Field

The present disclosure relates to a packaging assembly and method of assembly the package assembly. More particularly the present disclosure is directed to a package assembly that is multi-layered and foldable. In one embodiment of the disclosure the package assembly includes at least two panels and at least one cavity for receiving a recordable media disc therein and a container assembly that is multi-layered and foldable into the shape of a container.

Background of Related Art

Optical disc formats, such as compact discs (CDs), Blu-Ray™ optical video discs (BDs) and digital versatile discs (DVDs), are a popular medium to distribute media, such as music, movies, and computer software. Currently, there are a number of cases for optical discs on the market which purport to offer certain advantages, but still suffer from a number of limitations.

The music and entertainment industries have spent numerous years developing packing to protect the discs within while being portable. A common type of packaging for DVD and BD discs, the type most generally used for the marketing of movies and other entertainment products, is the AMARAY® package. The AMARAY® package is typically manufactured in two sizes depending on the mode of encoding of the discs therein (e.g., DVD or BD). An AMARAY® package is a two piece, injection-molded PVC/vinyl unit with a hinge. The package includes a hub for securing the disc or discs, and a vinyl pocket heat welded to the outer surface to accept a paper, selection-oriented graphic insert.

Another type of optical media packaging is the paper envelope or sleeve. It is the simplest, least expensive package. More expensive versions add a transparent window to the envelope allowing the disc label to be seen. This is both more durable and less abrasive than paper. However, such packaging is rare for commercial releases due to its relative lack of protection compared with other designs, and is primarily limited to promotional and demo discs.

Full metal packaging has been used more frequently for commercial discs. Packaging where the cover and outer panels are all metal provide more stability and durability. However, full metal packaging on its own is more costly to produce, may be heavy and bulky to transport, and may require more costly or more time consuming methods for inserting the discs.

The music and entertainment industries has spent numerous years developing aesthetically pleasing foldable containers that have thin edges, planar walls and is capable of maintaining high resolution imaging. A common type of container is made from paperboard or corrugated sheets. This material is undesirable as it is difficult to form a thin edge in paper containers. This is because the fold lines are typically created by a bar score that presses creases into the container blank. This method results in a thick edge because the container material is folded over itself when the container is assembled. Additionally, this overlap causes high internal stresses in the edges which give the container walls a "bowed walls" appearance. Furthermore, paper containers are not ideal because paper is not as rigid as plastics and metals, tears comparatively easily and is susceptible to water damage. Rough handing or contact with water can destroy the aesthetics of the container or the container itself Another type of container uses Polyethylene terephthalate (PET). PET and many other similar plastic materials suffer from clouding of the material when folded as a result of the structural change affected by plastic deformation. As a consequence of this phenomenon, bar scoring is the least ideal method of creating folds as it makes the edges of the container cloudy.

One method to avoid clouding is by incorporating a length of plastic for each intended crease in the container mold such that the length of plastic deforms into a "c" shape when folded into place, but this results in a thick and noticeable edge. Another method is the use of micro perforation which removes small amounts of material to leave tiny holes. This method only reduces the appearance of clouding on the edges and has an unappealing "bowed walls" appearance. Yet another method involves a using of radio-frequency (RF) energy to weaken the plastic at the intended fold lines. However, this process can be costly and time consuming and requires special RF energy application equipment which must be configured for each type of fold of a piece.

The present disclosure seeks to solve the problems with foldable containers in the market by providing a method of construction that results in edges that are thin and do not demonstrate clouding. The method also exhibits the highly desirable trait of having minimal score memory and, as a result of the precise cutting, the walls of the assembled container does not have a "bowed walls" appearance. These attributes produce a more durable and ascetically pleasing package. Furthermore, the combination of sheet printed plastic and reverse film lamination provides a long lasting, compelling graphic effects.

SUMMARY

One aspect of the present disclosure is directed to a foldable package assembly for storing recordable media which is lightweight and relatively thin that is multi-layered and made from various materials to provide stability and protection to the discs secured within.

An aspect of the present disclosure is directed to a package assembly including a rigid plastic layer having a top surface and a bottom surface, a flexible film layer adhered to the top surface of the rigid plastic layer and at least three score lines formed on the bottom surface of the rigid plastic layer, wherein the package assembly is configured to fold along each of the at least three score lines.

The flexible film layer or the rigid plastic layer of the package assembly may further include a printed graphic. The at least three score lines of the package assembly may be generally V-shaped, parallel with each other, and/or may be KISS cuts. Each of the at least three score lines may be parallel to each other. Further, the package assembly may be configured to fold approximately 80 degrees to 120 degrees along each of the at least three score lines. The bottom surface of the package assembly may have four score lines wherein each of the four score lines may define a first, second, third, and fourth panel, and a tab.

Another aspect of the present disclosure is directed to a method of manufacturing a package assembly including providing a rigid plastic layer having a top surface and a bottom surface, adhering a flexible film layer to the top surface of the rigid plastic layer, cutting at least three score lines into the bottom surface of the rigid plastic layer, trimming the rigid plastic layer and the adhered flexible film layer from a perimeter of the package assembly, and folding the package assembly along the at least three score lines.

According to an additional aspect of the method, a printed graphic may be provided onto the top surface of the rigid plastic layer or the flexible film layer. Further, the at least three score lines may be generally V-shaped, parallel with each other, and/or may be KISS cuts. Further, the package assembly may be configured to fold approximately 80 degrees to 120 degrees along each of the at least three score lines. Further, each of the three score lines may define a first, second, third, and fourth panels. The method may further include bonding the first and fourth panels together.

Alternatively the method may include a package assembly having four score lines. The four score lines may define first, second, third and fourth panels, and a tab. The method may further include adhering the first panel and the tab together or the method may include welding the first panel and the tab together.

These and other aspects of the present disclosure are described in detail and depicted in the accompanying drawings in which:

BRIEF DESCRIPTION OF THE DRAWINGS

FIG. 8A is a profile view of a core material of a package assembly according to another embodiment of the present disclosure;

FIG. 8B is a perspective view of foldable disc package assembly in an open position according to an alternate embodiment of the present disclosure;

FIG. 9 is a perspective view of the package assembly of FIG. 8 in a partially folded position;

FIG. 10 is a perspective view of the package assembly of FIG. 8 in a fully folded or closed position;

DETAILED DESCRIPTION

Figure 1:
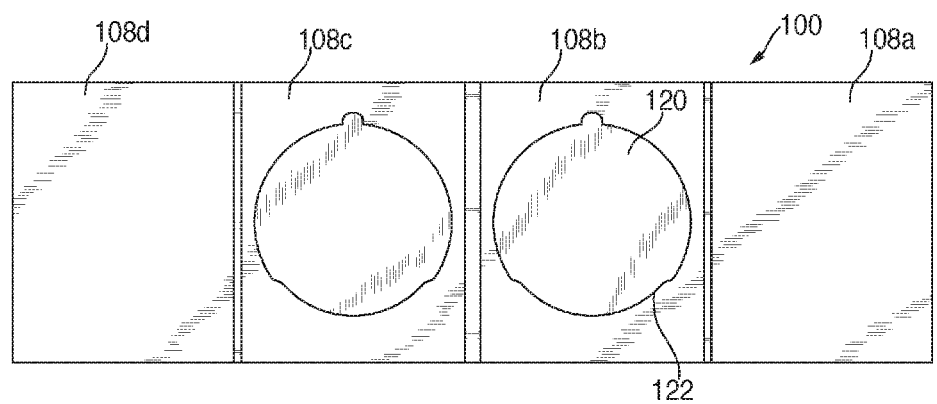
FIG. 1 is a top plan view of the package assembly in an open position according to one embodiment of the present disclosure.

Various embodiments of the presently disclosed apparatus for manufacture of a packaging assembly with reclosable connection will now be described in detail with reference to the drawings, wherein like reference numerals identify similar or identical elements. While one example of such a packaging assembly is directed to the storage of recordable media such as DVD's, the present disclosure is not so limited and the methods described herein can be incorporated into any packaging assembly as specifically set forth at least with respect to FIGS. 16-18.

Figure 2:
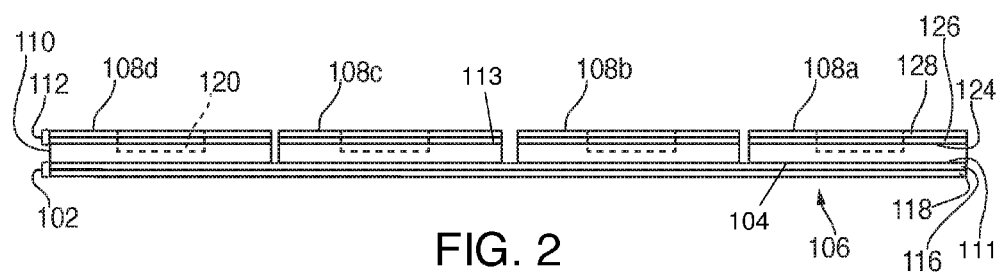
FIG. 2 is a side view of the package assembly of FIG. 1.

The present application hereby incorporates by reference the entirety of U.S. Provisional Patent Application No. 61/809,682 and U.S. Provisional Patent Application No. 61/900,641. A package assembly for storing recordable media discs is generally designated by the reference numeral 100 in FIG. 1. FIGS. 1 and 2 illustrate the package assembly 100 in an open position according to one embodiment of the present disclosure. The package assembly 100 is multi-layered including a first layer 102 having a top surface 104 and a bottom surface 106. One or more panels 108 are adhered to the top surface 104 of the first layer 102. In one embodiment, shown in FIGS. 1 and 2, four panels 108a, 108b, 108c, 108d are adhered to the top surface 104 of the first layer 102. A first panel 108a is disposed along a right edge of the first layer 102. A fourth panel 108d is disposed along a left edge of the first layer 102.

Each panel 108 is made from a core layer 110 and a second layer 112. The core layer 110 includes a plurality of die-cut cavities 120 for accepting the recordable media discs therein. The second layer 112 also includes plurality of removes 120a corresponding to the cavities 120 of the core layer 110. When placed over the core layer 110, a portion of the second layer 112 forms a lip 122 covering a portion of each cavity 120 and secures a recordable media placed discs therein. Lip 122 is shown as a small extension which overlies a portion of the circumference of cavity 120, however, various configurations are contemplated allowing the lip 122 to secure the recordable media discs. Alternatively, or in addition to the lip 122, a hub (not shown) may be positioned within the center of each cavity 120 to retain the recordable media discs. As shown, the die-cut cavity 120 and remove 120a (FIG. 7) are dimensioned for a standard media disc such as a compact disk (CD) or digital versatile disk (DVD), known in the art. However, it is envisioned that cavities of various shapes for items such as medication or small retail products may be cut into similar package assemblies.

In accordance with one embodiment, the first layer 102 of the package assembly 100 is a composite sheet formed of a flexible film layer 116 and a rigid plastic layer 118. The top surface 104 of the first layer 102 is formed of the film layer 116 and the bottom surface 106 is formed from the rigid plastic layer 118. Preferably, the rigid or substantially rigid plastic layer 118 is made from polyethylene terephthalate (PET) or similar material. The film layer 116 may be formed with a thickness in a range from about 0.001 in. to about 0.005 in., and in at least one embodiment is about 0.002 in. The rigid plastic layer 118 may be formed with a thickness in a range of about 0.005 in. to about 0.25 in, and in at least one embodiment is about .018 in. The core layer 110 is adhered to the top surface 104 of the first layer 102 (i.e. directly to the film layer 116) and is preferably made from chip board, solid bleach sulfate board, expanded PET, or other similar materials for providing stability to the package assembly 100. The core layer 110 may be of any thickness sufficient to accept a recordable media or other consumer product to be packaged within the assembly. For recording media, the core layer 110 may have a thickness of about 0.050 in. to about 0.060 in. According to one embodiment, the second layer 112 is also a composite sheet formed, preferably, of the same material as the first layer 102, however, in a reverse configuration. Accordingly, in one embodiment, the flexible film layer 126 of the second layer 112 is adhered to the core layer 110 and the rigid plastic layer 128 is disposed on top of the flexible film layer 126. However, this arrangement may be reversed without departing from the scope of the present disclosure. Both the film layer 116, 126 and the rigid plastic layer 118, 128 allow for printing text and graphics. This allows for both the exterior and interior of the package assembly 100 for the depiction of images and words relating to the recordable media discs, if desired. The first layer 102, core layer, 110 and second layer 112 are bonded together by any suitable means known in the art such as glue, adhesive, thermal bonding, heat sealing, and others know to those of skill in the art, which steps form part of the manufacturing process described below.

The package assembly 100 is shown and described with reference to specific material however it is understood that different materials that provide similar structure and stability may be used. For example, the first and second layers 102, 112 may be formed of paper, card board, chip board, and other non-plastic materials without departing from the scope of the present disclosure.

Figure 3:
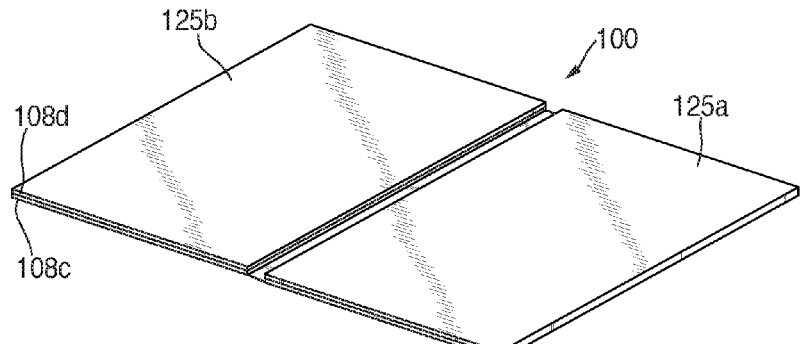
FIG. 3 is a perspective view of the package assembly of FIG. 1 in a partially folded position.
Figure 4:
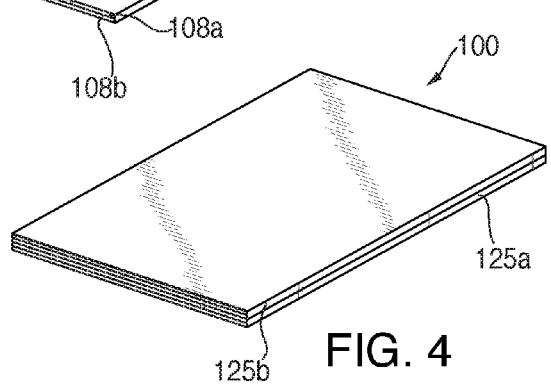
FIG. 4 is a perspective view of the package assembly of FIG. 1 in a fully folded or closed position.

FIGS. 1 and 2 illustrate the package assembly 100 in the open position for easily inserting and removing a recordable media disc. FIGS. 3 and 4 show the package assembly 110 in a partially folded and fully folded, or closed position, respectively. In the embodiment shown, the package assembly 100 is foldable by pivotally folding the first panel 108*a* over the second panel 108*b*. Similarly, pivotally folding the fourth panel 108*d* over the third panel 108*c*. As shown in FIG. 3, cavity 120 is enclosed in package assembly 100 securing media discs within. Each side 125*a*, 125*b*, is then pivotally folded together into the closed position as shown in FIG. 4. As will be described below with respect to the manufacturing procedure, the film layer 116 of the first layer 102 forms a hinge when a portion of the plastic layer 118 of the first layer 102 is removed allowing the folding of the assembly 100.

At least two magnets 130 (see FIG. 6) may be disposed within the core layer 110 in die cut openings 132. Preferably a first magnet 130 is disposed near the left edge of the first panel 108*a* and a second magnet 130 is disposed near a right edge of the fourth panel 108*d*. As sides 125*a*, 125*b* are folded together, the magnetic force of first and second magnets 130 secures the package assembly 100 in the closed position, as shown in FIG. 4. In the embodiment shown, magnets 130 are used to secure the package assembly however other similar closure methods such as a magnetic coating applied directly to the core layer 110 or second layer 112 may be used, where rather than requiring a die cut opening 132 and a magnet 130, a simple coating can be applied in a similar location during manufacturing.

Figure 5:
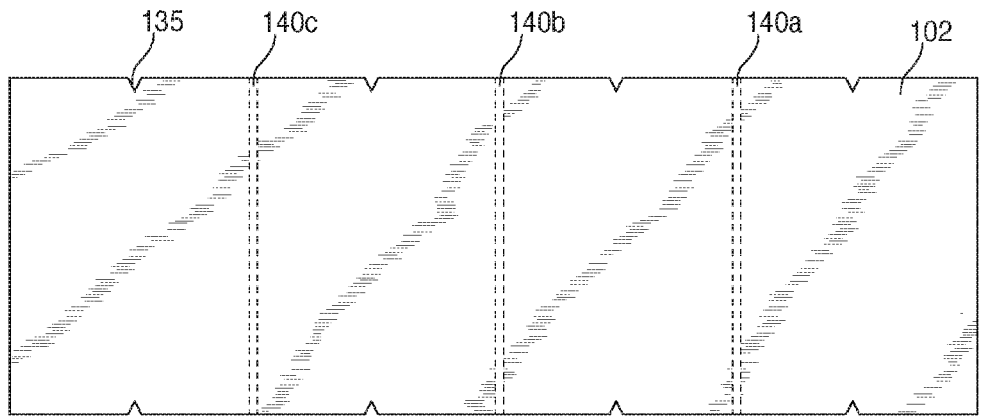
FIG. 5 is a top plan view of a first composite sheet of the package assembly of FIG. 1.
Figure 6:
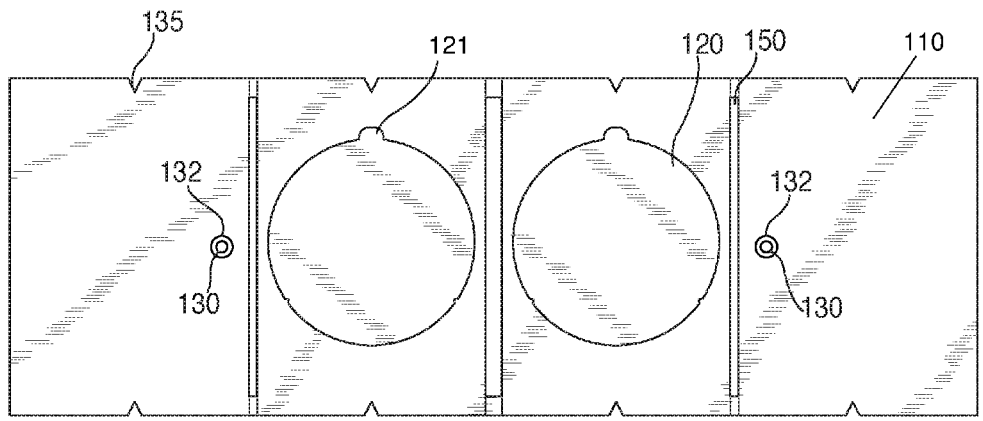
FIG. 6 is a top plan view of a core layer of the package assembly of FIG. 1.
Figure 7:
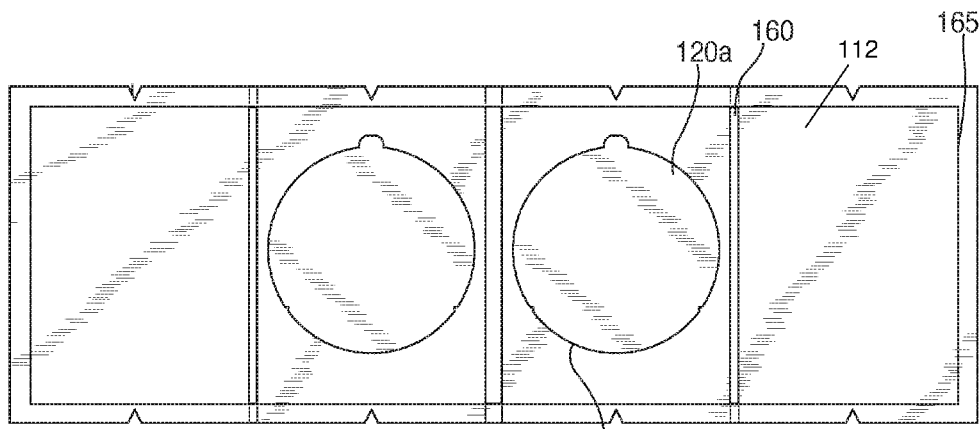
FIG. 7 is a top plan view of a second composite sheet of the package assembly of FIG. 1.

With reference to FIGS. 5-7, the layers of the package assembly 100 are shown prior to the completed the assembly. Cross hatching is depicted on each layer such that as the layers are built-up, (i.e. laid one on top of one another) the underlying layers can be referenced, where appropriate. The first layer 102, shown in FIG. 5, shows a plurality of alignment markers 135 along the perimeter. First layer 102, second layer 112, and the core 110 each have corresponding alignment markers 135 such that the layers are aligned prior to being adhered together. As described above, the first layer 102 and second layer 112 may include graphics, images, or text formed either on the film layer (116, 126) or the plastic layer (118, 128). The application of the graphics and the bonding of the film layer (116, 126) to plastic layer (118*m* 128) typically occurs prior to following manufacturing steps.

One of skill in the art will appreciate that the printing of both the first layer 102 and the second layer 112 may occur simultaneously. For example, the stock plastic material for (118, 128) and the stock film material (116, 126) may be twice the width of what is shown in FIGS. 5-7, and the printing may be applied to both the first layer 102 and the second layer 112 simultaneously, and subsequent to adhering to the film (116, 126) to the plastic (118, 128), the first layer 102 and second layer 112 are separated from one another by a longitudinal cut. Alternatively, the stock materials may be the same width as shown in FIGS. 5-7, but the graphics for the first layer 102 and the second layer 112 are printed serially and then cut transversely to separate them from each other for subsequent use.

According to one embodiment, during manufacturing a plurality of score lines 140*a-c* are formed on the bottom surface 106 or more specifically, in the rigid plastic layer 118, of the first layer 102. This may be done with a procedure referred to as KISS cutting. As shown in FIG. 5, three score lines 140*a-c* divide the package assembly 100 into four equal sections. These KISS cuts do not cut entirely though the rigid plastic 118. Alternatively, the score lines 140*a-c* may extend entirely through the rigid plastic layer 118 but not through a film layer 116 applied thereto.

Adhered to the top surface 104 of the first layer 102 is a first surface 111 of the core layer 110, shown in FIG. 2. The core layer 110 is adhered to the first layer 102 by matching the corresponding alignment markers 135. Though not described in detail herein, one of skill in the art will recognize that alternative means for registering the multiple layers of the packaging assembly 100 may be employed without departing from the scope of the present disclosure. The alignment markers 135 are just one example of such registration techniques.

As discussed above, in the present embodiment the core layer 110 includes at least one die-cut cavity 120 dimensioned to hold a media storage disc. As shown in FIG. 6, the at least one die-cut cavity 120 may include a tab 121 for easier insertion and removal of the media storage disc. The core layer 110 also includes at least two die-cut cavities 132 for securing magnets 130 therein. Additionally, a plurality of longitudinal die-cuts 150 are formed in the core layer 110 corresponding to, though not necessarily having the same dimensions as, the score lines 140*a-c* imparted to the first layer 102.

Adhered to a second surface 113 of the core layer 110 is the bottom surface 124 of the second layer 112. The second layer 112 is adhered to the core layer 110 also by matching the corresponding alignment markers 135. Similar to the core layer 110, the second layer 112 includes a plurality of longitudinal die-cuts 160 corresponding to the score lines 140*a-c* and die-cuts 150. As discussed above, the second layer 112 includes die-cut removes 120*a* which correspond to the die-cut cavities 120 of the core layer 110, and form a lip 122 to secure the media storage disc therein. Removes 120a are described in greater detail below.

Once the first layer 102, core 110, and second layers 112 are adhered together, the package assembly resembles a single multi-layered flat tray capable of holding at least one media storage disc within at least one cavity. The perimeter of the assembled layers is then trimmed along trim line 165 resulting in the assembly 100 of FIG. 1.

Finally, the assembly is folded along the score lines 140 either by hand or using a folding device (not shown) in a manner as discussed above with reference to FIG. 3 resulting in a package assembly 100 in a closed position securing at least one media storage disc therein. Where the score lines 140 are kiss cut, folding may cause a clean break to be formed in the plastic layer 118 of first layer 102. The clean break, or in instances where the plastic layer 118 to be cut through previously the cut, allows the film layer 116 which was not affected by the KISS cutting or scoring to act as a hinge connecting the now separated portions of plastic layer 118, 128. In an alternative embodiment, the KISS cut is of sufficient depth that folding of up to an including approximately 80-110° does not break the plastic layer 118, 128 resulting in the combination of the plastic layer 118, 128 and the film layers 116, 126 acting together as a hinge.

It is contemplated that the assembly 100 would be manufactured and shipped to a media replicator in its flat (i.e. rigid) form prior to folding. In such an arrangement, the media replicator can then readily insert the appropriate media, and then perform the final folding to create a finalized and filled packaging assembly 100 ready for sale to the public.

One of skill in the art will recognize that it may be beneficial to increase the thickness of the film layer 116 in the region where the hinges will be formed. This may be done by applying an additional thickness of film material those locations prior to or after bonding with the plastic layer 118.

Still a further embodiment of the present disclosure is directed to a method of manufacturing the package and container assemblies. As described above, one material employed as part of first layer 102, second layer 112 is Polyethylene terephthalate (PET). Materials, such as PET follow a relatively standard stress strain curve, in which when stress is applied to the material the material will initially elastically deform, meaning that the material will return to substantially its original form when the stress is released. The curve has an inflection point at which the stresses become so great that the material begins to suffer plastic deformation. In plastic deformation, the material suffers deformation from which it cannot on its own return to its original shape. PET and many other similar plastic materials suffer from clouding of the material as a result of the structural change affected by plastic deformation. In part, this clouding is a result of internal heating caused by the stresses applied and causes the crystalline structure of the PET material to change. As can be imagined, clouding of layer 118 (formed for example of PET) in a package assembly 100, caused by folding package assembly 100 to place it in its final form would be very undesirable.

To avoid clouding of plastics such as PET, there are a variety of expensive devices and procedures utilizing the application of radio-frequency (RF) energy along the fold line. The RF energy locally heats the PET and allows the material to be folded without the occurrence of clouding. These processes are well known in the plastics manufacturing art, but are costly and time-consuming requiring specialized machinery to apply the RF energy and simultaneously cool the PET or plastic material at the point of the fold or bend. One example of this technique is practiced by HLP Klearfold, and marketed under the name SOFT CREASE®.

As described herein a "KISS" cut may be used to substantially weaken the PET layer at selected points. A KISS cut is formed in a die cutting process where a layer to a predetermined depth without completely shearing through the layer. By weakening the PET layer, application of sufficient stress (e.g., folding along the KISS cut) causes the material to pass quickly through the plastic deformation phase of the stress-strain curve, and to reach structural failure point (i.e. breakpoint) before appreciable clouding of the PET layer develops. This methodology is quite good at achieving a crisp, straight, and aesthetically appealing edge on the PET layer.

As an alternative to a deep KISS cut, which upon folding results in the desired breakage and a clean edge, one embodiment of the present disclosure is directed to the use of a shallower KISS cut. The shallowness of the cut prevents the permanent fracture of the layer 118 that serves as the support structure of package assembly 100 or the rigid plastic layer 418 of container assembly 400. Additionally, the shallower KISS cutting, like the deeper KISS cutting does not experience the formation of the unsightly clouding. By lessening the depth of the cut upon the application of stress layer 118 stays within the stress strain curve, suffering plastic deformation but not breaking. The use of the KISS cut helps to mitigate internal stresses in the crystalline structure of the PET material, and relieve the internal stresses that cause the clouding, effectively the same function as the RF treatment, described above, but without the need of any additional equipment or additional manufacturing steps. This shallow KISS cut allows the PET material to fold about 90° (in embodiments, between 60 and 120°) without suffering clouding or breaking. Thus, the shallow KISS cutting enables the formation of sharp 90° corners without requiring breaking of the PET material. As is described elsewhere herein with reference to FIG. 17A, this may be accompanied by KISS cuts having chamfers.

As noted above, the folding does not impart sufficient stress to cause the PET layer to reach the breaking point. The result is that a PET hinge is formed at the point of the shallow KISS cut. One of the benefits of this hinge is that the PET layer remains continuous, meaning that it remains substantially water and dirt impervious along the hinge line. This increases the protective factor of the PET for the underlying laminate and printing preventing their absorption of moisture and potential discoloration. Further, it allows for the possibility of eliminating the protective laminate layer described in the co-pending application because there is no discontinuity in the PET layer, thus the application of printing directly to the PET layer becomes more desirable.

This same shallow KISS cutting may also be employed with other uses of PET, such as in the formation of protective covers or tops for boxes and the like in which products are sold. By employing these shallow KISS cuts, a box, cover or a sleeve may be formed that is protected by the PET layer, and has both a very well defined right-angle corner and a glossy finish. In some instances graphics or printing may be employed on the PET layer of the box, cover, or sleeve. Again the advantages are the avoidance of clouding of the PET layer, the reduction on overall manufacturing costs as compared to RF treatment, and the general improvement of the aesthetics of the product.

Yet a further embodiment of the present disclosure is directed to printing on the backside of the film laminate layers 116, 126. Alternatively, or in combination flood coatings may be applied to the core material layers 110, and the film layer 116, 126 may have a different color or graphics applied to it where effectively the color of the core material serves as the background to the graphics or letter applied to the film layer 116, 126. Similarly, as the printing may be applied directly to the rigid plastic layers 118, 128 the coloring or printing applied to the core material 110, may provide background for the print and lettering on rigid plastic layers 118, 128. Still further, the disc carrier space, as noted above, may have graphics applied to it. Further, printed graphics, which are heat treated to adhere to the package assembly 100, may be applied to the rigid plastic layers 118, 128. Still further, lens arrays may be employed, typically via a MYLAR® applique, to provide further decorative embodiments. Still further, stenciling or laser etching may be employed to create an indelible visual effect in the rigid plastic layers 118, 128.

With reference to FIGS. 8A-11, an alternate embodiment of the package assembly 100 is shown. In the embodiment shown in FIGS. 8Aa-11 the assembly 200 is formed of first and second layers 202 and 212 formed of paper or other non-plastic materials, a portion of which is depicted in FIG. 8a. Similar to package assembly 100, package assembly 200 includes a first layer 202 having a top surface 204 and bottom surface 206. The top surface 204 has at least one panel 208 adhered thereto. As shown in FIG. 8B in an open position, three panels 208 are disposed on the top surface 204. A first panel 208a is disposed along a right edge of the first layer 202 and a third panel 208c is disposed along a left edge of the first layer 202. Each panel 208 being pivotally engaged to the adjacent panel 208. Each panel 208 of package assembly 200 also includes die-cut cavities 220 for storing and retrieving a media storage disc. Also similar to package assembly 100, the second layer 212 of package assembly 200 includes a lip 222 for securing the media storage disc within the cavity 220. Rather than score lines, an embossing or other crease is formed in the first layer 202 to act as the hinge connecting the three portions of the assembly 200 and enabling them to be folded together. Printing may be applied to the bottom surface 206 of the first layer 202 and/or to a top surface 213 of the second layer. Using a process of folding, as described above, a flat formed packaging assembly 200, may be folded into a configuration as depicted in FIG. 4, with the difference being that the entirety of packaging assembly 200 is formed of paper and paper derivative materials.

Figure 11:
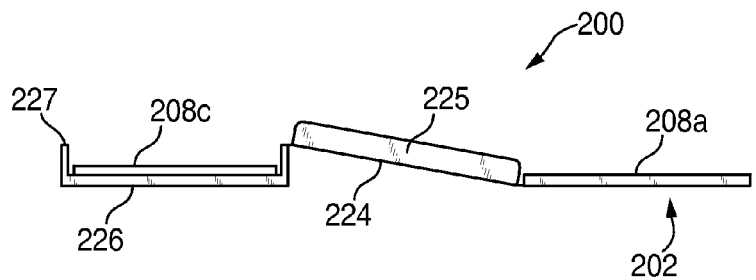
FIG. 11 is a side view of the package assembly of FIG. 8.

In a further embodiment, package assembly 200 may include a metal frame 221 adhered to the bottom surface 206 of the first layer 202. The metal frame 221 includes a first portion 224 and a second portion 226 (as shown in FIG. 11). The first and second portions 224, 226 are adhered to the bottom surface 206 in a similar manner as described above for adhering the first, core and outer layers of package assembly 100. The first portion 224 covers the bottom surface 206 corresponding to the second panel 208b and the second portion 226 covers the bottom surface 206 corresponding to the third panel 208c. The first and second portions 224, 226 of the metal frame 221 are preferably unattached to one another, except via the first layer 202, to allow the second and third panels 208b, 208c to remain pivotally engaged by a hinge formed of the first layer 202. The first portion 224 includes borders 225 disposed laterally along a top edge and bottom edge of the second panel 208b. The second portion 226 includes borders 227 disposed longitudinally along the right edge and left edge of the third panel 208c. The borders 225, 227 provide a full metal covering once package assembly 200 is in a closed position (as shown in FIG. 10). FIG. 9 illustrates package assembly in a partially folded position wherein the first panel 208a is pivotally folded over the second panel 208b such that the first panel 208 is between borders 225. The third panel 208c is then pivotally folded over the bottom surface 206 of the first panel 208a to fully enclose the media storage discs within the metal frame 221.

With reference to FIGS. 12-15, an alternate embodiment of the package assembly 100 is shown. Since the inception of the recorded digital disc, in store theft, whether by shoppers or employees has been an ongoing problem. Retailers and manufacturers have made many efforts over the years to add security features to their packaging in attempts to minimize theft. Thieves will generally remove the discs from the packaging in-store, and leave the empty package behind. Most efforts at interdiction revolve around impeding the process of surreptitious disc removal. Typically add-on security devices such as labels, EAS (electronic article surveillance) tags or integrated interlocks add to the cost and are aesthetically unappealing.

Figure 12:
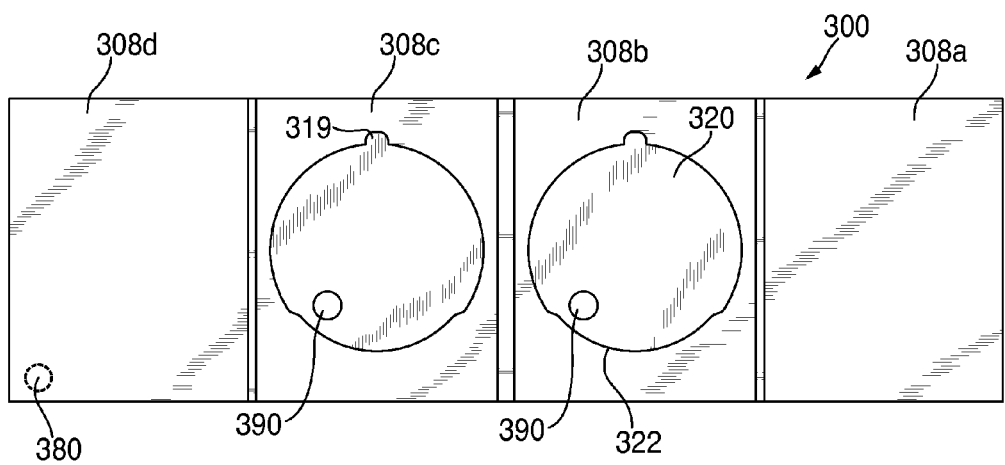
FIG. 12 is a top plan view of the package assembly in an open position according to one embodiment of the present disclosure.
Figure 13:
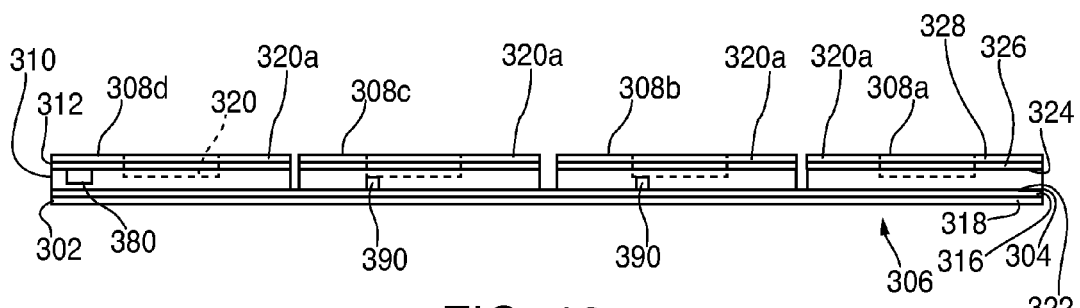
FIG. 13 is a side view of the package assembly of FIG. 12.

FIGS. 12 and 13 illustrate a package assembly 300 including a cut-out 380 that may be formed in the core layer 310. This cut-out 380 is for the insertion of a security device or EAS device. This placement within the casing improves security of the discs or other items within the package assembly 300, and further eliminates the use of unsightly stickers and the like that are commonly used for such purposes. Moreover, by being concealed within the core layer 310, the security device is not visible from the exterior of the package assembly 300, particularly when accompanied by the use of printing on layers 302 and 312 (i.e., either on layers 316, 318, 326, 328, as desired by the manufacturer.

A further feature of the present disclosure is the formation of a small viewing window 390 into the package assembly 300. As will be appreciated, this viewing window 390 is formed in the core layer 310 and portions of the first layer 302 (i.e., on the exterior surfaces of the package assembly when closed) are left without printing or sufficiently translucent printing such that the purchaser and eventual user can identify whether the discs are in the package assembly 300 without the need of opening.

The viewing window 390 has a variety of benefits. First, for the purchaser and the store owner it provides a method of ensuring that the discs are still retained within the package assembly 300 both when stocking shelves and at the point of purchase. This gives both parties a sense of security regarding the product, and can help alert the store owner to potential tampering, while also preventing the purchaser from buying an empty disc package and having to later return to the store. The window may even be employed at the store to perform an automated check that the discs are still retained in the packaging at the check-out counter of by a stock clerk using a hand held device. For example bar code reader or other light reflection technology may be employed to quickly check and confirm retention of discs within the packaging, without requiring visual inspection by an individual, and without requiring opening of the packaging.

Figure 14:
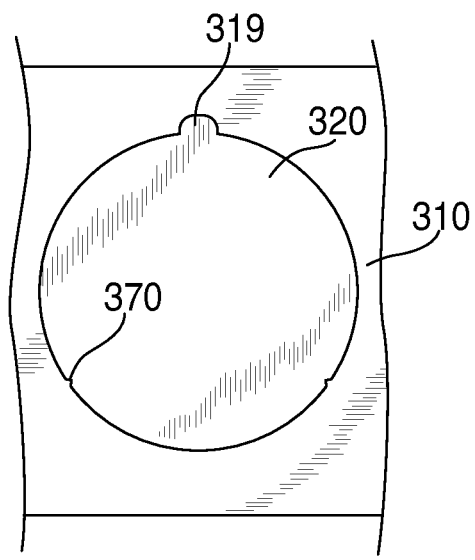
FIG. 14 is a top view of a retention device according to one aspect of the present disclosure.
Figure 15:
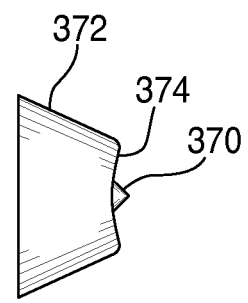
FIG. 15 is a top view of a portion of the package assembly of FIG. 14.

FIG. 14 illustrates one embodiment of the present disclosure directed to retention devices 370 formed on the inner periphery of a die cut cavity 320 formed in a core layer 310. These retention devices 370 are small formations, in one example having a generally triangular shape that extend from the inner edge of the core layer 310, into the cavity 320 itself. The retention devices 370 thus may be formed of the same material as the core layer 310. Alternatively, where the core layer 310 itself is formed of two or more layers, the retention devices 370 may be formed as shown in FIG. 15, with the retention device extending from a tab 372 and placed between the two layers. The tab 372 is secured between the two layers and the retention device 370 extends into the cavity 320. An inner edge 374 may have a curve which matches the curve of the cavity 320 of the core layer 320.

In one embodiment the retention devices 370 are formed in an area of the cavity 320 which will be covered by the lip 322, such that after assembly of the package assembly 300, the retention devices 370 are substantially hidden from view. The retention devices 370 may be formed from the core layer 310, which may be paper or chip board, etc., and as a result are generally compressible. Upon insertion of a disc, the retention members 370 compress slightly and bias the disc against the internal periphery of the cavity 320. Accordingly, the retention members 370 are useful during the manufacturing of the package assembly 300, to hold discs inserted into the cavity 320, prior to application of the second rigid layer 328, in instances where the discs are inserted during the assembly of the package assembly 300. But even after final assembly and sale of the package assembly 300, the retention devices 370 help to retain the discs in place when the package assembly is opened, particularly when used in combination with the lip 322.

The retention devices 370 may be of any shape (e.g., triangular, semi-spherical, etc.), and need not be larger than necessary to bias the disc against the periphery of the remove 320. Though described herein as being formed of a paper derivative, other materials are also suitable for the purpose, particularly where the retention devices 370 are formed of a separate component as shown in FIG. 15 and affixed to the core layer 310. Thus the retention devices 370 may be formed of more elastic materials such as rubbers, elastomers, and plastics as would be understood by those of skill in the art. When used with the securing of discs, the material should be chosen to prevent any undesirable impact to the disc that might render it inoperative. Other devices being secured into the package assembly might not require such a limitation.

Yet a further embodiment of the present disclosure is directed to a method of placing the discs into their respective cavities during the course of manufacturing the package assembly 300 itself rather than the traditional method of two-phase activity of package assembly formation and then disc loading. As described herein with reference to package assembly 100, package assembly 300 is also formed by sequentially boding together a number of layers including first layer 302, second layer 312, and core layer 310. Each of these layers may themselves be comprised of one or more layers. For example second layer 312 may be formed of a PET layer 328 and a film layer 326. The core layer 310 and the second layer 312 typically have disc cavities 320 and removes 320a formed in them prior to bonding the layers together. According to the present disclosure, the remove 320a may be only partially cut into layer 326, for example to create recess 319 for insertion of a finger as will be described below. The rest of the remove 320a may be scored such that with the application of force that portion of the film layer 326 may be removed. Accordingly, during manufacturing of the package assembly 300, the disc may be inserted into the disc cavities 320 before bonding the second layer 312 to the core layer 310. The film layer 326 then covers the discs. The discs are now securely held within the disc cavities 320, even before final processing of the package assembly 300.

Further, the portion of film layer 326 that would ordinarily be removed to form the removes 320a act as a security cover, even after final processing of the package assembly 300 because they are not removed during manufacturing but are left in place to be removed by a purchaser. This provides additional assurance to the consumer that the item they are opening is "factory fresh" and has not been tampered with. To remove the disc from the package assembly 300 in which the portion of film layer 326 which will form the remove 320a has not been removed during package assembly 300 construction, the user may simply place a finger into the recess 319 and pull on the film layer 326 exposing the disc that is underneath. The disc may then be removed and the portion of film layer 326 removed may be discarded.

As can be imagined speed is key to the thief's activities and even a small delay and cause them to be detected, or at least bring their activities to the attention of the store and prompt a search. Because of the additional steps required to remove the portion of film layer 326 to create remove 320a, time that the customer is happy to expend, sufficient additional burden is placed on the potential thief to substantially prevent the in-store thief from seeking to remove the disc.

A further benefit of the use of the portion layer 326 that might otherwise be removed during manufacturing is that it may receive printing and become part of the aesthetics of the overall package assembly 300. Thus, when the package assembly 300 is opened, the purchaser sees a continuous design across the panels 308. Thus for example, if the package assembly 300 is to hold discs of a recent movie release, the graphics across the panels 308 may present a series of scenes from the movie, and thus increasing the impact of the package assembly 300 on the viewer. To prevent the diminishment of the aesthetics of the packaging upon removal of the portion of film layer 326, the discs themselves may also be printed with the same portions of the overall scene, thus the effective appearance of the package assembly 300 does not change a after these portions are removed and the discs are exposed. Still further, the same image may be printed on disc cavity 320 formed in the core layer 310 (i.e., below where the discs are typically held). In this manner the consistency of the scene remains even after the disc itself is removed. As an alternative, each of these, the portion of film layer 326 to be removed, the disc, and the bottom of the disc cavity 320 may have different printing, providing an opportunity to increase the effective user interaction space of the packaging system, and thus increase the amount of information that can be imparted to the purchaser.

Yet a further use of the portions of film layer 326 that overly the disc cavity 320 is as covering for the bottom of the disc cavity 320. During manufacturing, the second layer 312, including plastic layer 328 and film laminate 326 are printed and adhered together. Removes 320a are not completely formed, much as in the embodiment described above for the security device. Rather than being retained connected to the rest of film layer 326, or completely removed and discarded, those portions which will ultimately overlie the disc cavities 320 are mostly cut, but held in place by nicks formed by the die cutter. Preferably these nicks are located at the left and right corners of lip 322. During manufacturing, a press is applied to those portions of film layer 326 which overlie the disc cavities 320. The press breaks the nicks and causes the portion of film layer 326 to be separated from the rest of the film layer 326 and plastic layer 328. The press causes the portions of film layer 326 to contact the bottom of the disc cavity 320 and be permanently joined thereto by an adhesive which has been previously applied in the disc cavity. Alignment is guaranteed as the second layer 312 including layers 328 and 326 are registered with the core layer 310, prior to application of the press, and the die cuts formed in the second layer 312 and the core layer 310 are substantially the same. In some instances, it may be necessary to increase the thickness of the core layer 310 to accommodate the additional thickness of the portion of the layer 326 which is now adhered to the bottom of the disc cavity 320.

Thought the foregoing examples were described with respect to the use of film layer 326, plastic layer 328 may be used alternatively or in conjunction with film layer 326 to form removes, the security device, and or the aesthetic aspects without departing from the scope of the present disclosure.

Figure 16:
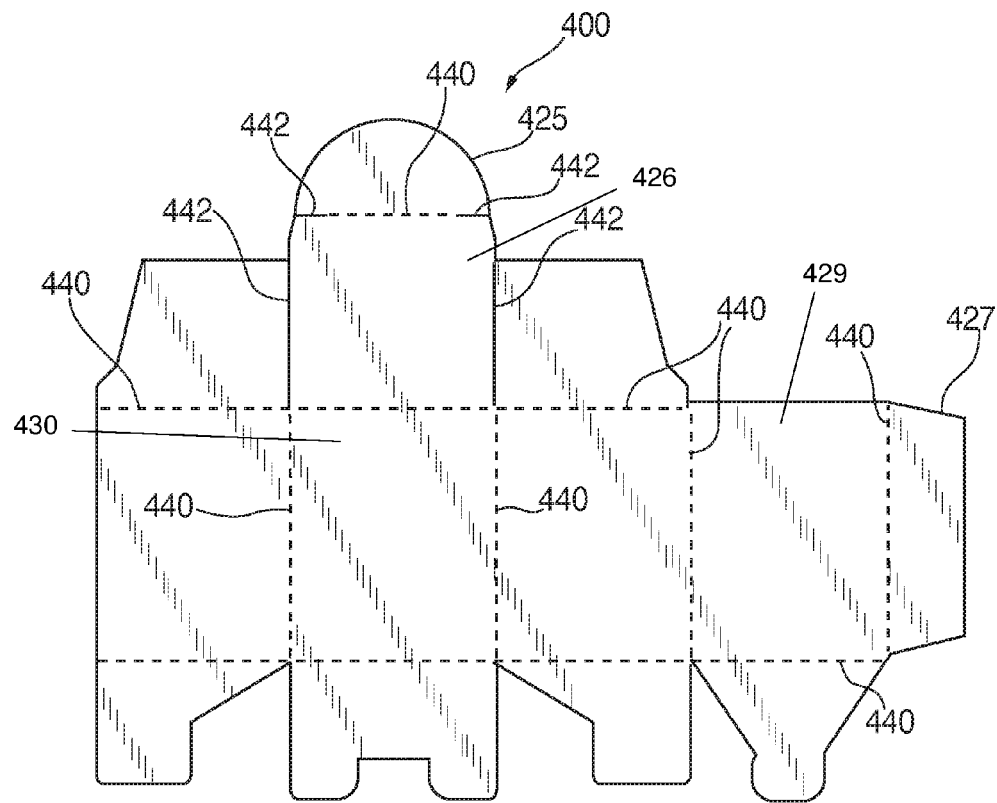
FIG. 16 is a top plan view of the container assembly in an open position according to one embodiment of the present disclosure.
Figure 17:
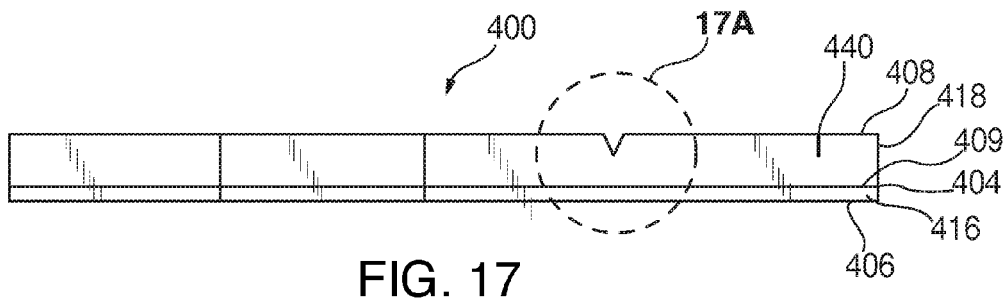
FIG. 17 is a side view of the container assembly in FIG. 16.
Figure 18:
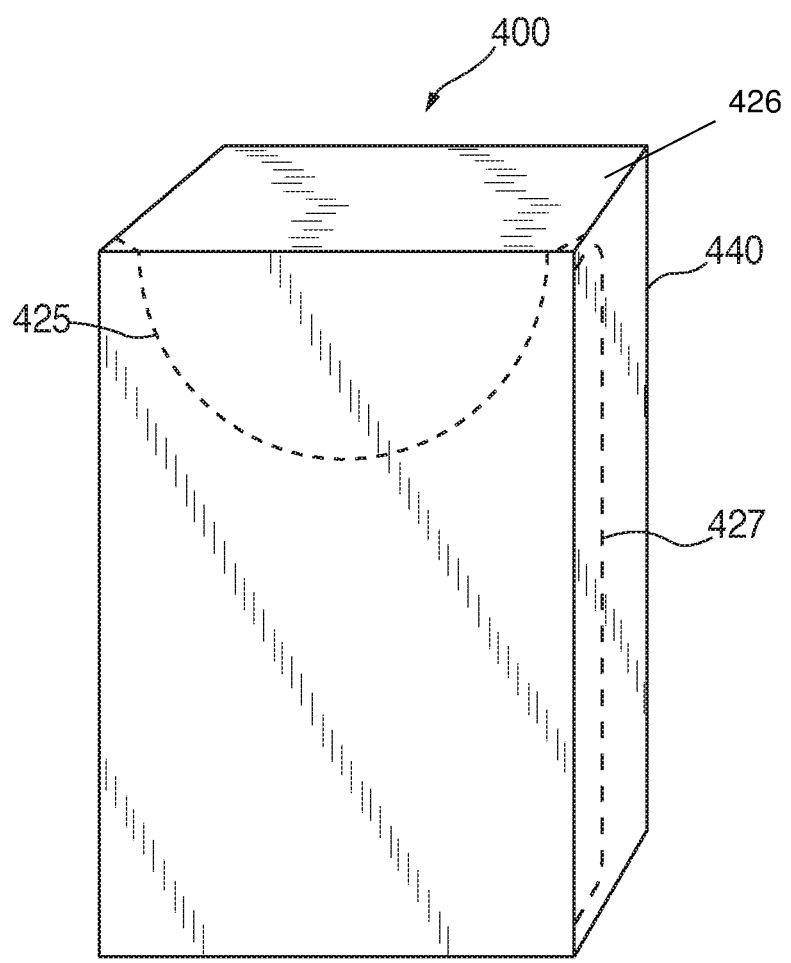
FIG. 18 is a perspective view of the container assembly of FIG. 16 folded into final form.

Yet a further embodiment of the present disclosure is depicted as container assembly 400 in FIGS. 16-18. FIG. 16 illustrates the container assembly 400 in flat form following die cutting from a source material and scoring to identify fold lines. The container assembly 400 includes a flap portion 425 that is pivotally attached to a top portion 426, a tab portion 427 that is pivotally attached to a front portion 429 and a right portion 430. Also shown in FIG. 16 is a plurality of score lines 440.

FIG. 17 illustrates a side view of the container assembly 400 in FIG. 16 including a flexible film layer 416 having a top surface 404 and a bottom surface 406 and a rigid plastic layer 418 having a top surface 408 and a bottom surface 409. The top surface 404 of the flexible film layer 416 is coupled to the bottom surface 409 of the rigid plastic layer 418. Preferably, the rigid or substantially rigid plastic layer 418 is made from polyethylene terephthalate (PET) or similar material. The film layer 416 may be formed with a thickness in a range from about 0.001 in. to about 0.005 in., and in at least one embodiment is about 0.002 in. The rigid plastic layer 418 may be formed with a thickness in a range of about 0.005 in. to about 0.25 in, and in at least one embodiment is about 0.018 in. However, this arrangement may be reversed without departing from the scope of the present disclosure. Both the film layer 416 and the plastic layer 418 allow for printing text and graphics. This allows for both the exterior and interior of the container assembly 400 for the depiction of images and words, if desired.

The film layer 416 and plastic layer 418 are bonded together by any suitable means known in the art such as glue, adhesive, thermal bonding, heat sealing, and others known to those of skill in the art, which steps form part of the manufacturing process described below.

During manufacturing a plurality of score lines 440 are formed on the top surface 408 of the rigid plastic layer 418. Also similar to package assembly 100, this process may be done with a procedure referred to as KISS cutting, though other methods may be employed without departing from the scope of the present disclosure. As shown by reference numeral 440 in FIG. 17, these scores do not cut entirely though the rigid plastic layer 418.

Figure 17A:
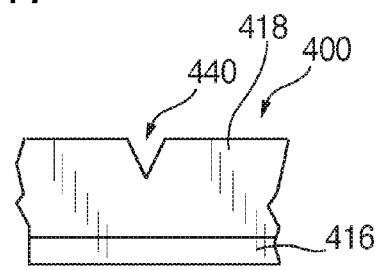
FIG. 17A is a close-up view of a portion of FIG. 17.

As shown by example in FIG. 16, seven score lines and four cut-throughs divide the container assembly 400 into thirteen portions, which when assembled forms a box shape. The score lines allow the portions of the container assembly to be folded along the score line to an angle between about 80 and 120° without breaking that portion of the rigid plastic layer 418 which was not cut in the scoring process. The result is that the portions of the rigid plastic layer 418 which remain after the scoring, in combination with the film layer 416 form a hinge allowing clean folds to be formed without discoloring the rigid plastic layer. Moreover, if the scoring is performed such that two chamfered edges are formed as shown in FIG. 17A, folding can be accomplished such that the film layer 416 is on an exterior surface of the container assembly 400, resulting in a clean, breakless corner being formed. Still further, where the scoring is deeper still, the folding can cause a clean break to be formed in the plastic layer 418. The clean break allows the film layer 416 which was not affected by the KISS cutting or scoring to act as a hinge connecting the now separated portions of plastic layer 418. It is contemplated that the container assembly 400 would be manufactured and shipped in its open form prior to folding. In such an arrangement, the purchaser can then perform the final folding. The container assembly 400 is shown and described with reference to a box shape, however it is understood that different shapes may be used.

FIG. 18 depicts the final container assembly 400 following folding along scores 440, and cut throughs 442. A flap portion 425 is pivotally attached to the top portion 426 and is inserted into a container cavity (not shown) when the container is assembled to close the container. A tab portion 427, is adhered to an internal surface of the container to form the generally cube shaped container assembly 400 from the flat cut material depicted in FIG. 16.

It will be understood that various modifications may be made to the embodiments of the presently disclosed package assembly. Therefore, the above description should not be construed as limiting, but merely as exemplifications of embodiments. Those skilled in the art will envision other modifications within the scope and spirit of the present disclosure.

What is claimed is:

1. A package assembly comprising:
   a rigid plastic layer having a top surface and a bottom surface;
   a flexible film layer adhered to the bottom surface of the rigid plastic layer; and
   at least three score lines formed on the top surface of the rigid plastic layer, the rigid plastic layer having a planar configuration separated by each of the at least three score lines,
   wherein the package assembly is configured to fold along each of the at least three score lines such that the flexible film layer defines a hinge and the rigid plastic layer defines a clean edge, the rigid plastic layer defining a panel of a container between each hinge such that the flexible film layer defines an internal cavity of the container.

2. The package assembly of claim 1, wherein the flexible film layer includes a printed graphic.

3. The package assembly of claim 1, wherein the rigid plastic layer includes a printed graphic.

4. The package assembly of claim 1, wherein the at least three score lines are generally V-shaped.

5. The package assembly of claim 1, wherein the at least three score lines are KISS cuts.

6. The package assembly of claim 1, wherein each of the at least three score lines are parallel to each other.

7. The package assembly of claim 1, wherein the package assembly is configured to fold approximately 80 degrees to 120 degrees along each of the at least three score lines.

8. The package assembly of claim 1, wherein the top surface of the rigid plastic layer has four score lines, the four score lines define first, second, third, and fourth panels, and a tab portion.

9. The package assembly of claim 8, wherein the tab portion includes an adhesive flap configured to adhere the tab portion and one of the first, second, third, or fourth panels.

10. The package assembly of claim 1, wherein the rigid plastic layer defines an external surface of the container.

11. The package assembly of claim 1, wherein the internal cavity of the container is configured to removably receive an object therethrough.

\* \* \* \* \*